US011635596B2

(12) United States Patent
Bachar et al.

(10) Patent No.: US 11,635,596 B2
(45) Date of Patent: Apr. 25, 2023

(54) TWO-STATE ZOOM FOLDED CAMERA

(71) Applicant: Corephotonics Ltd., Tel-Aviv (IL)

(72) Inventors: Gil Bachar, Tel Aviv (IL); Gal Shabtay, Tel Aviv (IL); Ephraim Goldenberg, Ashdod (IL); Roy Rudnick, Tel Aviv (IL); Michael Dror, Nes Ziona (IL); Noy Cohen, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 48 days.

(21) Appl. No.: 17/268,104

(22) PCT Filed: Aug. 12, 2019

(86) PCT No.: PCT/IB2019/056846
§ 371 (c)(1),
(2) Date: Feb. 12, 2021

(87) PCT Pub. No.: WO2020/039302
PCT Pub. Date: Feb. 27, 2020

(65) Prior Publication Data
US 2021/0325643 A1    Oct. 21, 2021

Related U.S. Application Data

(60) Provisional application No. 62/720,939, filed on Aug. 22, 2018.

(51) Int. Cl.
*G02B 13/00*    (2006.01)
*G02B 27/30*    (2006.01)
(Continued)

(52) U.S. Cl.
CPC .......... *G02B 13/0065* (2013.01); *G02B 7/04* (2013.01); *G02B 13/003* (2013.01); *G02B 15/06* (2013.01); *G02B 27/30* (2013.01)

(58) Field of Classification Search
CPC .......... G02B 13/0065; G02B 13/003; G02B 13/007; G02B 7/02; G02B 7/023;
(Continued)

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 201514511 U | 6/2010 |

(Continued)

OTHER PUBLICATIONS

Statistical Modeling and Performance Characterization of a Real-Time Dual Camera Surveillance System, Greienhagen et al., Publisher: IEEE, 2000, 8 pages.

(Continued)

*Primary Examiner* — Marin Pichler
(74) *Attorney, Agent, or Firm* — Nathan & Associates; Menachem Nathan

(57) ABSTRACT

A zoom camera comprising an optical path folding element (OPFE) for folding the light from a first optical path to a second optical path, a first lens having a first optical axis and a first effective focal length $EFL_{L1}$, the first optical axis being along the second optical path, a collimating lens having a second optical axis, and an image sensor located on the second optical path, wherein the collimating lens is movable between at least a first state and a second state, wherein in the first state the collimating lens is positioned in the second optical path between the OPFE and the first lens such that light entering the first lens arrives only from the image side of the collimating lens, and wherein in the second state the collimating lens is positioned outside the first
(Continued)

optical path such that light entering the first lens does not arrive from the image side of the collimating lens.

12 Claims, 3 Drawing Sheets

(51) Int. Cl.
*G02B 7/04* (2021.01)
*G02B 15/06* (2006.01)

(58) Field of Classification Search
CPC ... G02B 7/04; G02B 7/08; G02B 7/09; G02B 7/10; G02B 7/18; G02B 7/1805; G02B 7/182; G02B 15/04; G02B 15/06; G02B 15/08; G02B 27/64; G02B 27/646; G03B 5/00; G03B 5/02; G03B 5/04; G03B 5/32; G03B 5/34; G03B 5/36; G03B 2205/00; G03B 2205/0007; G03B 2205/0015; G03B 2205/003; G03B 2205/0046; G03B 2205/0053; G03B 2205/0061; G03B 2205/0069
USPC ........ 359/359, 641, 555, 556, 557, 813, 814
See application file for complete search history.

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Furkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |

(56) References Cited

U.S. PATENT DOCUMENTS

| | | |
|---|---|---|
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0097707 A1* | 4/2010 | Seo ............... G02B 15/145129  359/672 |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0025866 A1* | 2/2011 | Seo ............... G02B 15/06  359/686 |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |

(56) References Cited

U.S. PATENT DOCUMENTS

| | | |
|---|---|---|
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |

FOREIGN PATENT DOCUMENTS

| | | | |
|---|---|---|---|
| CN | 102739949 | A | 10/2012 |
| CN | 103024272 | A | 4/2013 |
| CN | 103841404 | A | 6/2014 |
| EP | 1536633 | A1 | 6/2005 |
| EP | 1780567 | A1 | 5/2007 |
| EP | 2523450 | A1 | 11/2012 |
| JP | S59191146 | A | 10/1984 |
| JP | 04211230 | A | 8/1992 |
| JP | H07318864 | A | 12/1995 |
| JP | 08271976 | A | 10/1996 |
| JP | 2002010276 | A | 1/2002 |
| JP | 2003298920 | A | 10/2003 |
| JP | 2004133054 | A | 4/2004 |
| JP | 2004245982 | A | 9/2004 |
| JP | 2005099265 | A | 4/2005 |
| JP | 2006238325 | A | 9/2006 |
| JP | 2007228006 | A | 9/2007 |
| JP | 2007306282 | A | 11/2007 |
| JP | 2008076485 | A | 4/2008 |
| JP | 2010204341 | A | 9/2010 |
| JP | 2011085666 | A | 4/2011 |
| JP | 2013106289 | A | 5/2013 |
| KR | 20070005946 | A | 1/2007 |
| KR | 20090058229 | A | 6/2009 |
| KR | 20100008936 | A | 1/2010 |
| KR | 20140014787 | A | 2/2014 |
| KR | 101477178 | B1 | 12/2014 |
| KR | 20140144126 | A | 12/2014 |
| KR | 20150118012 | A | 10/2015 |
| WO | 2000027131 | A2 | 5/2000 |
| WO | 2004084542 | A1 | 9/2004 |
| WO | 2006008805 | A1 | 1/2006 |
| WO | 2010122841 | A1 | 10/2010 |
| WO | 2014072818 | A2 | 5/2014 |
| WO | 2017025822 | A1 | 2/2017 |
| WO | 2017037688 | A1 | 3/2017 |
| WO | 2018130898 | A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: Eurographics, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

\* cited by examiner

TWO-STATE ZOOM FOLDED CAMERA

CROSS REFERENCE TO RELATED APPLICATIONS

This is a 371 application of international patent application PCT/IB2019/056846 filed Aug. 12, 2019, and claims the benefit of priority from U.S. provisional patent application No. 62/720,939 filed Aug. 22, 2018, which is incorporated herein by reference in its entirety.

BACKGROUND

Cameras with folded optical paths (also referred to as "folded cameras") and zoom capabilities (also referred to herein as "zoom folded camera"), with lenses having lens elements in which relative lens element position is changed are known. In existing camera design, a high accuracy in relative lens shift is required, which leads to high costs and/or low manufacturing yield. This is particularly true in "miniature" or "compact" folded cameras of the type that may be used in mobile devices such as smartphones.

There is therefore a need for, and it would be advantageous to have miniature zoom cameras with high optical tolerance to low accuracy in relative lens shift.

SUMMARY

In exemplary embodiments there are provided zoom cameras comprising an OPFE for folding the light from a first optical path to a second optical path, a first lens having a first optical axis and a first effective focal length $EFL_{L1}$, the first optical axis being along the second optical path, a collimating lens having a second optical axis, and an image sensor located on the second optical path, wherein the collimating lens is movable between at least two (first and second) states, wherein in the first state the collimating lens is positioned in the second optical path between the OPFE and the first lens such that light entering the first lens arrives only from the image side of the collimating lens, and wherein in the second state the collimating lens is positioned outside the first optical path, such that light entering the first lens does not arrive from the image side of the collimating lens.

In an exemplary embodiment, in the first state the camera has a first combined effective focal length $EFL_{C1}$ different than $EFL_{L1}$, and in the second state the camera has a second combined effective focal length $EFL_{c2}$ equal to $EFL_{L1}$.

In an exemplary embodiment, a difference between $EFL_{C1}$ and $EFL_{C2}$ is of at least ±10%.

In an exemplary embodiment, a difference between $EFL_{C1}$ and $EFL_{C2}$ is of at least ±50%.

In an exemplary embodiment, a difference between $EFL_{C1}$ and $EFL_{C2}$ is of at least ±80%.

In an exemplary embodiment, in the first state, the first and second optical axes are parallel and a distance between the two optical axes does not change $EFL_{C1}$.

In an exemplary embodiment, in the first state, a distance between the first and collimating lenses does not change $EFL_{C1}$.

In some exemplary embodiments, the collimating lens is a telescopic lens.

In some exemplary embodiments, the first lens is operative to move along the first optical axis to change camera focus in both the first state and second state.

BRIEF DESCRIPTION OF THE DRAWINGS

Aspects, embodiments and features disclosed herein will become apparent from the following detailed description when considered in conjunction with the accompanying drawings.

DETAILED DESCRIPTION

Figure 1A:
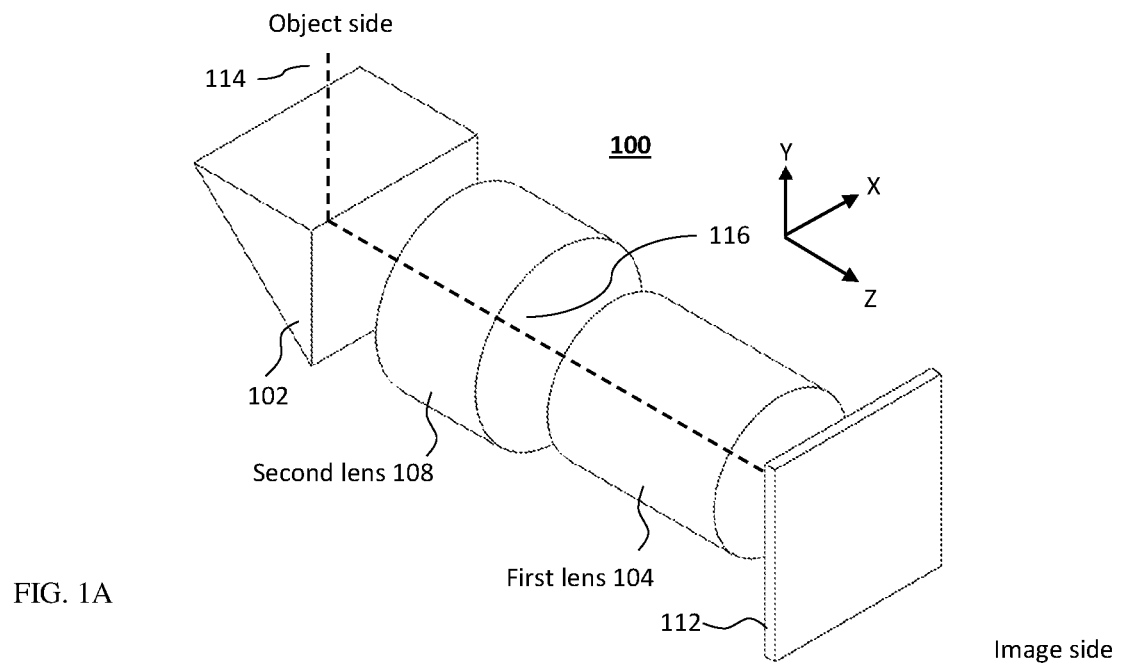
FIG. 1A shows an embodiment of a two-state zoom folded camera in a first state disclosed herein in a first operational mode in isometric view.
Figure 1B:
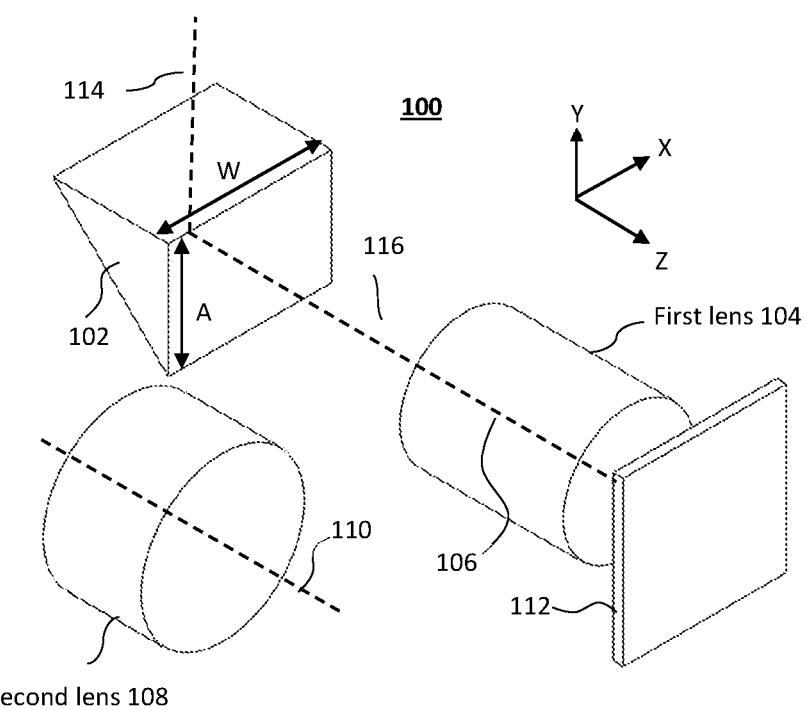
FIG. 1B shows the two-state zoom folded camera in a second operational mode in isometric view.
Figure 1C:
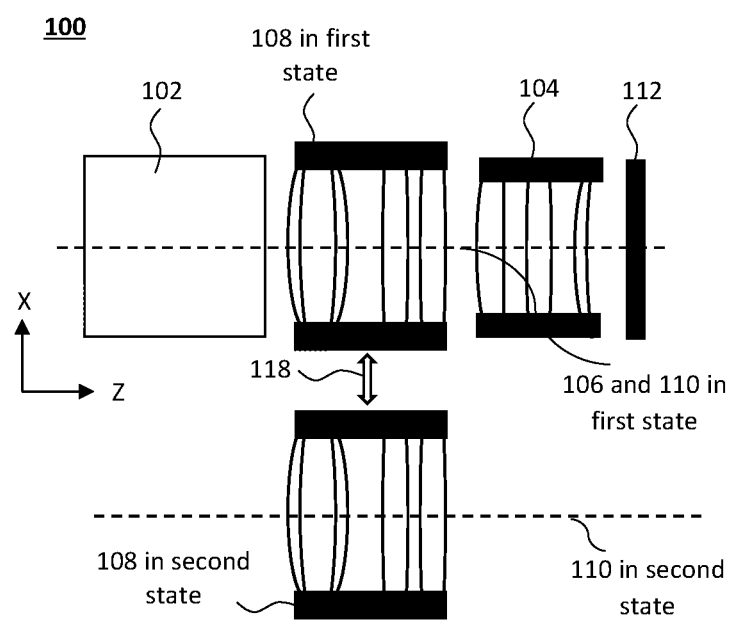
FIG. 1C shows the first and second operational mode of the camera of FIGS. 1A and 1B in a top view.

FIG. 1A shows an embodiment of a two-state zoom folded camera disclosed herein and numbered 100. FIGS. 1A and 1B show camera 100 from an isometric view in two different operational states, while FIG. 1C shows camera 100 from a top view, with camera 100 shown in two operational modes for illustration. The operational modes are described in more detail below. Camera 100 comprises an optical path folding element 102 (OPFE) (e.g. mirror, a prism), a first, imaging lens 104 with a first optical axis 106, a second, collimating lens 108 with a second optical axis 110 and an image sensor 112. OPFE 102 is capable of folding a light from a first optical path 114 to a second optical path 116. First lens 104 has a first effective focal length $EFL_{L1}$. First optical axis 106 is perpendicular to first optical path 114. Image sensor 112 is positioned with an image plane normal parallel to second optical axis 110 (i.e. the plane is perpendicular to the second optical axis). Camera 100 may include additional elements that are common in known cameras and are therefore not presented for simplicity. Such elements may comprise a protective shield, a protective optical window between the first lens and the image sensor to protect from dust and/or unneeded or unwanted light wavelengths (e.g. IR, ultraviolet (UV)), and other elements known in the art. In one example (shown below in FIGS. 2A-C), a protective optical window 202 between the first lens and the image sensor is presented.

Imaging lens 104 and collimating lens 108 may comprise each a single lens element or a plurality of lens elements. Embodiments of lenses 104 and 108 are shown in FIG. 1C with three and four lens elements respectively in an illustrative manner only. The number of lens elements in each lens may change (e.g. between 1 and 7 lens elements per lens).

In zoom camera 100, collimating lens 108 may shift mechanically between at least two operational states (or simply "states").

FIG. 1A show camera 100 in a first operational state in which collimating lens 108 is located along second optical 116 path between OPFE 102 and first lens 104. In the first operational state, the camera 100 has a first effective camera focal length ($EFL_C$) $EFL_{C1}$ that is equal to the combined power of the two lenses 104 and 108.

FIG. 1B show a second operational state in which collimating lens 108 is located away from the second optical path. In the second operational state, camera 100 has a second (combined) effective camera focal length $EFL_{C2}$ equal to the first effective focal length $EFL_{L1}$ of first lens 104.

FIG. 1C shows a top view of the system in the two operation modes, where an arrow 118 shows the motion direction of collimating lens 108.

The optical design of collimating lens 108 is such that $EFL_{C2}$ is different from $EFL_{C1}$. According to an example, collimating lens 108 may be a telescopic lens, such that the introduction of the collimating lens 108 into the second optical path 116 increases or decreases $EFL_C$ from $EFL_{C2}$ to $EFL_{C1}$. According to an example, $EFL_{C2}$ is different (smaller or larger) by more than 10% from $EFL_{C1}$. According to an example, $EFL_{C2}$ is different by more than 80% from $EFL_{C2}$. According to an example, $EFL_{C2}$ is in the range of 10-18 mm and $EFL_{C1}$ is in the range of 20-36 mm According to an example, $EFL_{C2}$ is in the range of 10-18 mm and $EFL_{C1}$ is in the range of 5-9 mm.

Figure 2A:
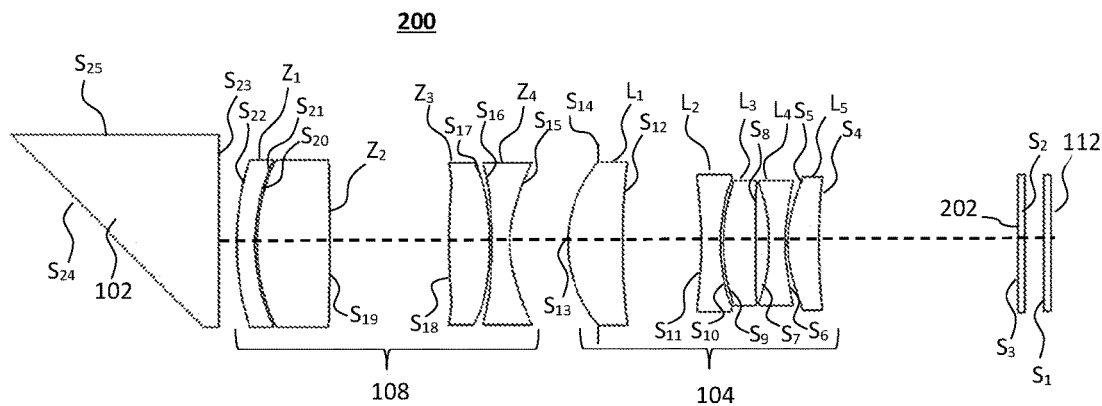
FIG. 2A shows a camera as in FIG. 1 with an exemplary optical design.
Figure 2B:
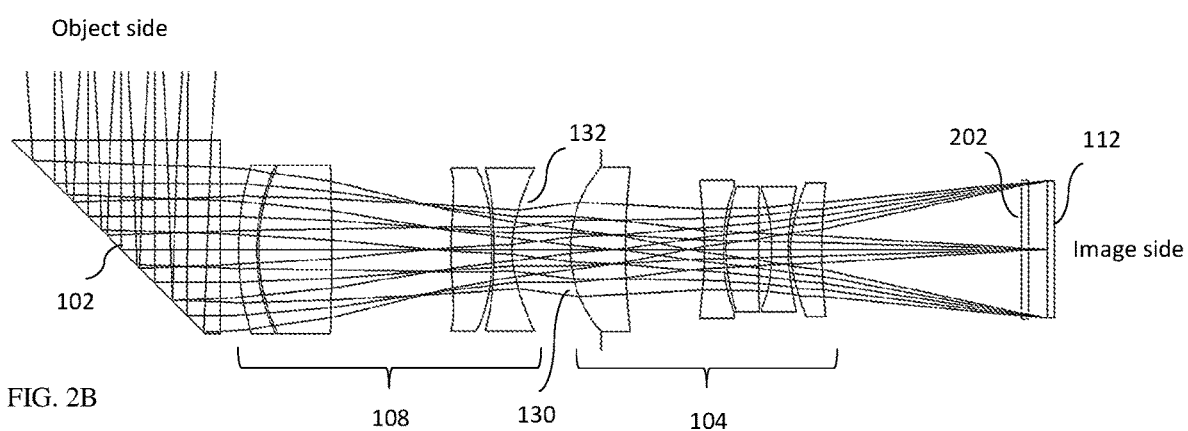
FIG. 2B shows the camera of FIG. 2A in a first operational state with ray tracing.
Figure 2C:
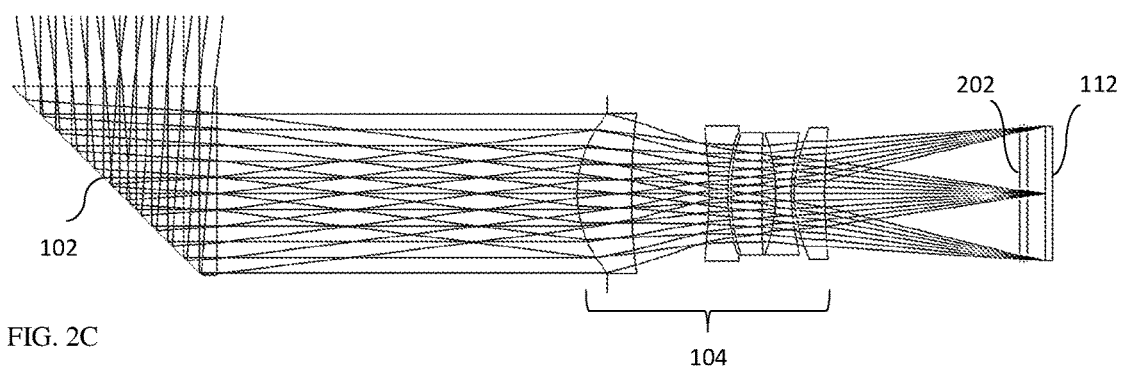
FIG. 2C shows the camera of FIG. 2A in a second operational state with ray tracing.

FIGS. 2A-C show an embodiment of a camera numbered 200 that has an exemplary optical design given in Tables 1-3 below. FIG. 2A shows camera 200 in the first operational state. In camera 200, first lens 104 comprises five lens elements marked L1 to L5 and collimating lens 108 comprises 4 lens elements marked Z1 to Z4. As mentioned, the number of lens elements in each lens is exemplary, and in other optical designs the number of lens elements may be different (e.g. 1-7 lens element in each lens). In camera 200, OPFE 102 is a prism. In camera 200, a protective glass 202 is added to the optical design.

Tables 1-3 below provide the optical design of camera 200. The surfaces of various optical elements are listed starting from the sensor 112 (image) side to the prism 102 (object) side. Table 1 provide data for all the surfaces except the prism surfaces: "type" is the surface type (flat or aspheric), R is the surface radius of curvature, T is the surface thickness, Nd is the surface refraction index, Vd is the surface Abbe number, D/2 is the surface semi diameter. Table 2 provide aspheric data for aspheric surfaces in Table 1, according to the following formula:

Q type 1 surface sag formula:

$$z = \frac{cr^2}{1 + \sqrt{1 - (1+k)c^2r^2}} + D_{con}(u)$$

$$D_{con}(u) = u^4 \sum_{n=0}^{N} A_n Q_n^{con}(u^2)$$

$$u = \frac{r}{r_{max}}, x = u^2$$

$$Q_0^{con}(x) = 1 \quad Q_1^{con} = -(5 - 6x) \quad Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

where {z, r} are the standard cylindrical polar coordinates, c is the paraxial curvature of the surface, k is the conic parameter, $r_{max}$ is one half of the surfaces clear aperture, and $A_n$ are the polynomial coefficients shown in lens data tables.

Table 3 provide data for surfaces of prism 202 only: A is the prism (without bevel) face length, W is the face width, and other fields are like in Table 1. Note that a prism may or may not have a bevel.

In camera 200, first lens 104 has an EFL of 15 mm. The design of second (collimating) lens 108 is of a telescopic lens. Lens 108 in camera 200 has a magnification ratio of 2: two lens elements L1 and L2 form a positive doublet with a focal length of 15 mm and two lens elements L3 and L4 form a negative doublet with a focal length of −7.5 mm. As a result, when in the first operational state, the camera has an EFL of $EFL_{C1}$=30 mm. When in the second operation state, the camera has an EFL of $EFL_C2$=$EFL_{C1}$=15 mm. In another example, replacing collimating lens 108 with a lens having a magnification ratio of 0.5 (e.g. by using a first negative doublet with a focal length of −15 mm and a second positive doublet with a focal length of 7.5 mm) would result in decreasing $EFL_C$ by factor of 2. Thus, in this example, the ratio $EFL_{C1}/EFL_{C2}$ in cameras 100 and 200 can be in the range of 0.2 to 5.

The telescopic design of collimating lens 108 allows for a less accurate positioning of collimating lens 108 relative to first lens 104: a shift and/or tilt of collimating lens 108 in any direction (in particular shift along first optical axis 106, shift perpendicular to first optical axis 106, and/or rotation of the lens) will not change the magnification ratio. For example, relative to a nominal position (presented in FIG. 2 and Tables 1-3) in which first optical axis 106 of first lens 104 and second optical axis 110 of collimating lens 108 coincide (merge), and distances between the first lens and the collimating lens are given (Table 1), the collimating lens can move in any direction (X,Y,Z) by up to 50 μm, 100 μm or even 0.2 mm, and rotate in any direction (yaw, pitch, roll) by 0.5 degree, 1 degrees or 2 degrees without affecting or minimally affecting camera operation.

Note that in the first state, the first and second optical axes are parallel and a change in distance between the two optical axes does not change $EFL_{C1}$. Similarly, a change in distance between the first and collimating lenses does not change $EFL_{C1}$. That is, in the first state, $EFL_{C1}$ is substantially independent of the distance between optical axes of, or distances between lenses 104 and 108.

FIG. 2B shows camera 200 in the first operational state with ray tracing. The optical design of camera 200 is such that in the first state light entering first lens 104 at an object side 130 is coming (arrives) only from an image side 132 of collimating lens 108. FIG. 2C shows camera 200 in the second operational state with ray tracing. The optical design of camera 200 is such that in the second operational state light entering first lens 104 at object side 130 is not coming from image side 132 of collimating lens 108 (i.e. it bypasses collimating lens 108) but comes directly from OPFE 102.

In cameras 100 and 200, focusing in both operational states may be performed by moving first lens 104 along first optical axis 106. In both cameras, optical image stabilization (OIS) in both operational states may be performed by moving first lens 104 perpendicular to optical axis 106 and/or by tilting OPFE 102 and/or by combining shift of first lens 104 and tilt of OPFE 102. These actions may be performed using actuators or mechanisms known in the art.

TABLE 1

| # | Comment | Type | R [mm] | T [mm] | Nd | Vd | D/2 [mm] |
|---|---|---|---|---|---|---|---|
| $S_1$ | Image | flat | Infinity | 0.500 | | | 1.878 |
| $S_2$ | IR Filter | flat | Infinity | 0.210 | 1.516 | 64.167 | 1.900 |
| $S_3$ | | flat | Infinity | 5.460 | | | 1.900 |

TABLE 1-continued

| # | Comment | Type | R [mm] | T [mm] | Nd | Vd | D/2 [mm] |
|---|---|---|---|---|---|---|---|
| $S_4$ | $L_5S_2$ | Q-Type Aspheric | −13.571 | 0.853 | 1.650 | 21.513 | 1.831 |
| $S_5$ | $L_5S_1$ | Q-Type Aspheric | −2.840 | 0.079 | | | 1.797 |
| $S_6$ | $L_4S_2$ | Q-Type Aspheric | −3.728 | 0.436 | 1.534 | 55.663 | 1.706 |
| $S_7$ | $L_4S_1$ | Q-Type Aspheric | 6.712 | 0.368 | | | 1.648 |
| $S_8$ | $L_3S_2$ | Q-Type Aspheric | −248.667 | 0.883 | 1.534 | 55.663 | 1.654 |
| $S_9$ | $L_3S_1$ | Q-Type Aspheric | −4.471 | 0.081 | | | 1.706 |
| $S_{10}$ | $L_2S_2$ | Q-Type Aspheric | −5.197 | 0.518 | 1.650 | 21.513 | 1.706 |
| $S_{11}$ | $L_2S_1$ | Q-Type Aspheric | 9.451 | 2.152 | | | 1.895 |
| $S_{12}$ | $L_1S_2$ | Q-Type Aspheric | −24.950 | 1.523 | 1.484 | 84.146 | 2.250 |
| $S_{13}$ | $L_1S_1$ | Q-Type Aspheric | −3.349 | −0.840 | | | 2.250 |
| $S_{14}$ | Stop | flat | Infinity | 2.435 | | | 2.250 |
| $S_{15}$ | $Z_4S_2$ | Q-Type Aspheric | −3.166 | 0.500 | 1.829 | 42.726 | 2.230 |
| $S_{16}$ | $Z_4S_1$ | Q-Type Aspheric | 38.480 | 0.060 | | | 2.230 |
| $S_{17}$ | $Z_3S_2$ | Q-Type Aspheric | 12.476 | 1.111 | 1.650 | 21.513 | 2.230 |
| $S_{18}$ | $Z_3S_1$ | Q-Type Aspheric | −11.693 | 3.270 | | | 2.230 |
| $S_{19}$ | $Z_2S_2$ | Q-Type Aspheric | 88.558 | 2.000 | 1.665 | 55.117 | 2.300 |
| $S_{20}$ | $Z_2S_1$ | Q-Type Aspheric | −5.530 | 0.060 | | | 2.300 |
| $S_{21}$ | $Z_1S_2$ | Q-Type Aspheric | −5.556 | 0.500 | 2.005 | 21.000 | 2.300 |
| $S_{22}$ | $Z_1S_1$ | Q-Type Aspheric | −7.644 | 0.500 | | | 2.300 |

TABLE 2

| # | k | $r_{max}$ | $A_0$ | $A_1$ | $A_2$ | $A_3$ | $A_4$ | $A_5$ |
|---|---|---|---|---|---|---|---|---|
| $S_4$ | −0.834 | 1.858 | 3.55E−02 | −6.06E−03 | 2.26E−04 | 5.15E−04 | −2.26E−04 | −2.10E−05 |
| $S_5$ | −6.008 | 1.858 | 1.50E−02 | −1.73E−02 | 6.19E−03 | −1.50E−03 | 7.16E−05 | −1.84E−05 |
| $S_6$ | −17.754 | 1.833 | 3.32E−02 | −1.56E−02 | 6.87E−03 | −4.24E−03 | 1.27E−03 | −4.59E−04 |
| $S_7$ | −8.169 | 1.833 | 1.56E−01 | −1.90E−02 | 4.15E−03 | −8.86E−04 | 5.73E−03 | 4.55E−04 |
| $S_8$ | 116.131 | 1.903 | 2.11E−03 | 2.66E−02 | 3.50E−02 | 1.36E−02 | 1.03E−02 | 2.09E−03 |
| $S_9$ | −1.064 | 1.903 | 7.70E−02 | −3.48E−03 | 9.94E−03 | −3.66E−03 | −1.75E−03 | −1.37E−03 |
| $S_{10}$ | −1.581 | 1.953 | −1.10E−01 | −8.34E−02 | −4.32E−02 | −2.31E−02 | −9.94E−03 | −2.84E−03 |
| $S_{11}$ | −3.312 | 1.953 | −7.74E−02 | 3.73E−03 | −3.48E−03 | 5.87E−04 | −3.68E−04 | 5.19E−05 |
| $S_{12}$ | −81.481 | 2.754 | −8.12E−02 | 6.15E−03 | 4.95E−05 | 1.13E−05 | −6.61E−05 | −1.87E−06 |
| $S_{13}$ | −0.263 | 2.754 | −6.88E−02 | −8.71E−03 | −1.15E−03 | −1.54E−05 | −6.84E−07 | 9.92E−08 |
| $S_{15}$ | −0.624 | 3.600 | 8.51E−01 | −2.00E−01 | 2.69E−02 | −4.74E−03 | 0.00E+00 | 0.00E+00 |
| $S_{16}$ | −99.998 | 3.600 | 5.34E−02 | −3.81E−01 | 1.98E−02 | −1.08E−02 | 0.00E+00 | 0.00E+00 |
| $S_{17}$ | 5.259 | 3.600 | 1.69E+00 | 1.57E−01 | 6.69E−02 | −5.86E−03 | 0.00E+00 | 0.00E+00 |
| $S_{18}$ | −3.735 | 3.600 | 2.85E+00 | 6.02E−01 | 8.16E−02 | 2.81E−04 | 0.00E+00 | 0.00E+00 |
| $S_{19}$ | −29.541 | 3.750 | 5.18E−02 | 2.26E−02 | −2.67E−03 | −7.68E−04 | 0.00E+00 | 0.00E+00 |
| $S_{20}$ | −0.096 | 3.750 | −4.51E−02 | 2.86E−02 | 3.54E−03 | 2.66E−04 | 0.00E+00 | 0.00E+00 |
| $S_{21}$ | 0.022 | 3.750 | −5.04E−02 | 3.29E−02 | 9.80E−03 | 2.21E−03 | 0.00E+00 | 0.00E+00 |
| $S_{22}$ | 0.548 | 3.750 | −1.41E−02 | −1.70E−02 | −4.03E−03 | −7.61E−04 | 0.00E+00 | 0.00E+00 |

TABLE 3

| # | Type | R [mm] | T [mm] | Nd | Vd | A/2 [mm] | W/2 [mm] |
|---|---|---|---|---|---|---|---|
| $S_{23}$ | Prism Object side | Infinity | 3.050 | 1.840 | 23.000 | 2.850 | 3.000 |
| $S_{24}$ | Prism Reflective face | Infinity | −2.650 | 1.840 | 23.000 | — | — |
| $S_{25}$ | Prism Image side | Infinity | — | | | 2.850 | 3.000 |

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A zoom camera comprising:
   a) a single optical path folding element (OPFE) for folding the light from a first optical path to a second optical path;
   b) a first lens having a first optical axis and a first effective focal length $EFL_{L1}$, the first optical axis being along the second optical path;
   c) a collimating lens having a second optical axis; and
   d) an image sensor located on the second optical path, wherein the collimating lens is movable to provide at least a first state and a second state, wherein in the first state the collimating lens is positioned in the second optical path between an image side of the single OPFE and the first lens such that light entering the first lens arrives only from the image side of the collimating lens, and wherein in the second state the collimating lens is positioned outside the second optical path such that light entering the first lens arrives directly from the image side of the single OPFE and does not arrive from the image side of the collimating lens.

2. The zoom camera of claim 1, wherein in the first state the camera has a first combined effective camera focal length $EFL_{c1}$ different than $EFL_{L1}$, and wherein in the second state the camera has a second combined effective camera focal length $EFL_{c2}$ equal to $EFL_{L1}$.

3. The zoom camera of claim 2, wherein a difference between $EFL_{L1}$ and $EFL_{c2}$ is of at least ±10%.

4. The zoom camera of claim 3, wherein the first lens is operative to move along the first optical axis to change camera focus in both the first state and second state.

5. The zoom camera of claim 2, wherein a difference between $EFL_{L1}$ and $EFL_{c2}$ is of at least ±50%.

6. The zoom camera of claim 5, wherein the first lens is operative to move along the first optical axis to change camera focus in both the first state and second state.

7. The zoom camera of claim 2, wherein a difference between $EFL_{L1}$ and $EFL_{c2}$ is of at least ±80%.

8. The zoom camera of claim 7, wherein the first lens is operative to move along the first optical axis to change camera focus in both the first state and second state.

9. The zoom camera of claim 1, wherein the collimating lens is a telescopic lens.

10. The zoom camera of claim 1, wherein the first lens is operative to move along the first optical axis to change camera focus in both the first state and second state.

11. The zoom camera of claim 2, wherein the collimating lens is a telescopic lens.

12. The zoom camera of claim 2, wherein the first lens is operative to move along the first optical axis to change camera focus in both the first state and second state.

\* \* \* \* \*